US008279351B2

(12) United States Patent
Bakhmutsky

(10) Patent No.: US 8,279,351 B2
(45) Date of Patent: Oct. 2, 2012

(54) METHOD AND APPARATUS FOR HARDWARE-EFFICIENT CONTINUOUS GAMMA CURVE ADJUSTMENT

(75) Inventor: Michael Bakhmutsky, Tustin, CA (US)

(73) Assignee: RGB Systems, Inc., Anaheim, CA (US)

( * ) Notice: Subject to any disclaimer, the term of this patent is extended or adjusted under 35 U.S.C. 154(b) by 417 days.

(21) Appl. No.: 12/605,765

(22) Filed: Oct. 26, 2009

(65) Prior Publication Data

US 2010/0201887 A1    Aug. 12, 2010

Related U.S. Application Data

(60) Provisional application No. 61/197,571, filed on Oct. 27, 2008.

(51) Int. Cl.
*H04N 5/202* (2006.01)

(52) U.S. Cl. ........ 348/674; 348/675; 345/589; 345/591; 345/600; 345/601; 345/602

(58) Field of Classification Search .................. 348/674, 348/675; 345/589, 591, 600, 601, 602
See application file for complete search history.

(56) References Cited

U.S. PATENT DOCUMENTS

| 5,175,621 | A | * | 12/1992 | Maesato | ............... 348/676 |
| 5,398,076 | A | * | 3/1995 | Lum et al. | ............... 348/676 |
| 6,166,781 | A | * | 12/2000 | Kwak et al. | ............... 348/674 |
| 6,181,444 | B1 | * | 1/2001 | Sato | ............... 358/519 |
| 6,573,934 | B1 | * | 6/2003 | Lee | ............... 348/254 |
| 6,611,290 | B1 | * | 8/2003 | Sato | ............... 348/333.01 |
| 6,697,127 | B2 | * | 2/2004 | Suzuki | ............... 348/674 |
| 7,167,658 | B2 | * | 1/2007 | Ooki et al. | ............... 399/49 |
| 7,463,295 | B2 | * | 12/2008 | Asada et al. | ............... 348/254 |
| 2007/0009050 | A1 | * | 1/2007 | Wang et al. | ............... 375/240.29 |
| 2008/0018569 | A1 | * | 1/2008 | Sung et al. | ............... 345/82 |
| 2009/0015576 | A1 | * | 1/2009 | Hu | ............... 345/211 |
| 2009/0141037 | A1 | * | 6/2009 | Zhou | ............... 345/589 |

* cited by examiner

*Primary Examiner* — Jefferey Harold
*Assistant Examiner* — Mustafizur Rahman
(74) *Attorney, Agent, or Firm* — The Hecker Law Group, PLC

(57) ABSTRACT

In accordance with at least one embodiment, a first representation of a first gamma curve is stored in a look-up table, a second representation of a second gamma curve is stored in a look-up table, and a video signal is modified in accordance with an interpolation of at least a portion of the first representation of the first gamma curve and at least a portion of the second representation of the second gamma curve. In accordance with at least one embodiment, the at least a portion of the first representation of the first gamma curve is multiplied by a one's complement of a normalized weight factor, the at least a portion of the second representation of the second gamma curve is multiplied by the normalized weight factor, and the results are added together to obtain an output video signal.

5 Claims, 8 Drawing Sheets

METHOD AND APPARATUS FOR HARDWARE-EFFICIENT CONTINUOUS GAMMA CURVE ADJUSTMENT

CROSS-REFERENCE TO RELATED APPLICATION

This patent application claims the benefit of the filing date of U.S. Provisional Patent Application Ser. No. 61/197,571, filed Oct. 27, 2008, which is incorporated by reference in its entirety herein.

BACKGROUND OF THE INVENTION (1) Field of the Invention

The invention relates generally to image processing and more specifically to gamma curve adjustment.

(2) Description of the Related Art

Gamma refers to a value, typically denoted by the Greek letter γ (i.e., gamma), used to quantify contrast of an image, such as a photographic or video image. Gamma represents the slope of a curve relating a logarithmically expressed output value to a logarithmically expressed input value, according to the following equation:

$$\gamma = \frac{d\log(V_{out})}{d\log(V_{in})}.$$

As images are processed using different technologies, different values of gamma may be appropriate for different circumstances. As images are transferred among systems or subsystems, it may be appropriate to adjust the gamma values. Also, because of the typical nonlinearity of gamma curves, adjustment of gamma values may be used to obtain compression of information denoting contrast of an image when such information is stored or transmitted, allowing more faithful retrieval or reception of the image represented by the information. Thus, one gamma curve may be used for encoding an image for storage, transmission, and/or processing, while another gamma curve may be used for decoding the image for retrieval, reception, processing, or display. When encoding image data, such data may include gamma-encoded values rather than linear intensity values. When such data are decoded, gamma adjustment can be performed using gamma curves appropriate for any desired output devices, such as display devices. For example, images may be encoded with a gamma of about 0.45 and decoded with a gamma of 2.2, which is typical of common display devices.

A gamma curve can be used to approximate a relationship between an encoded luminance value in a image processing system, such as a television system or computer system, and the actual desired image luminance. As a gamma curve is typically approximated by a power-law relationship, a gamma curve typically exhibits nonlinearity. In accordance with such nonlinearity, equal steps in encoded luminance correspond roughly to subjectively equal steps in brightness. Because the physics of display devices causes display devices to respond nonlinearly to input signals, gamma curve adjustment can be used to compensate for display device characteristics. For example, a cathode ray tube (CRT), converts an applied voltage to light nonlinearly because the phosphor coating on its screen responds nonlinearly. A CRT provides a light intensity I in proportion to a source voltage raised to the power gamma, as showing in the following equation:

$$I \propto V_S^\gamma$$

Specific values of gamma are standardized for particular formats, such as the NTSC, PAL, and SECAM video formats. Other values of gamma may be applicable to other signal capture, storage, processing, and display devices. For a CRT such as those typically used a computer display device, γ is typically about 2.2. In the case of a monochrome CRT, when a video signal having a level of 0.0 is provided to the display, a pure black output is produced, and when a video signal having a level of 1.0 is provided to the display, a pure white output is produced. Thus, those two extremes represent points on the curves that are common among different gamma curves. Other values that lie between those points, such as a level of a video signal having a value of 0.5, which represents a middle shade of gray, yield an intensity that depends on the particular gamma curve. For example, if the value of 0.5 were to be provided to a display having a gamma of 2.2, the resulting intensity (e.g., brightness) on the display would be about 0.22, which would be a darker-than-desired shade of gray.

The nonlinearity of the display device that would otherwise result in significant error can be compensated for by applying an inverse transfer function such that the system response is substantially linear. Thus, the inverse transfer function essentially nonlinearly alters a video signal to become an altered video signal that is then altered back to its desired form by the nonlinearity of the display device. An example of an inverse transfer function is as follows:

$$V_C \propto V_S^{(1/\gamma)}$$

where $V_C$ is the corrected voltage being provided as an output of the inverse transfer function and $V_S$ is the source voltage being received as an input to the inverse transfer function. For example, if γ is 2.2, then the inverse of γ is 1/γ, which is equal to 1/2.2 or 0.45 in that example.

While a monochrome example has been discussed, gamma curve adjustment can also be applied to color images by adjusting the color parameters of the color images. For example, in a system where colors are expressed as weighted combinations of the primary colors red, green, and blue, each of the red, green, and blue color parameters can have its own corresponding gamma attribute, which can be denoted as γR, γG, and $\gamma_B$, respectively, or a single gamma attribute can be applied to all three color parameters.

Gamma curve adjustment can be applied to a variety of image formats, such as still images and video images. Gamma curve adjustment can be used to adjust a nonlinear operation by which attributes of the images, such as contrast and luminance, may be encoded and decoded. The application of gamma curve adjustment to an image may be described by the following power-law transfer function:

$$V_{out} = V_{in}^\gamma$$

where the input value Vin and the output value Vout are non-negative real values, typically within a defined range such as between zero and one (i.e., normalized). Other ranges of the input value Vin and the output value Vout can be accommodated by mathematically converting them (e.g., normalizing them) to and/or from the defined range. Gamma values less than one are typically used for encoding, while gamma values greater than one are typically used for decoding. The nonlinearity of the transfer function and the inverse relationship of the encoding and decoding gamma values allow compression and expansion of the dynamic range of image parameters, such as contrast and luminance, within the range over which their values may be encoded and decoded. Thus, a wider range of such image parameters can be accommodated using a smaller range of possible data values (e.g., number of bits representative of the encoded data), which can reduce data storage, transmission, and processing requirements. If normalized values of the input value Vin and the output value Vout are used, the power-law transfer function set forth above provides that an input value Vin of zero will yield an output value Vout of zero and that an input value Vin of one will yield an output value Vout of one, regardless of the value of gamma. However, different values of gamma will cause a specific input value Vin, where 0<Vin<1, to yield a different output value Vout for each respective different value of gamma. Thus, the respective gamma curves will differ for the respective different values of gamma.

While gamma curves can be implemented so as to conform continuously to a single mathematical expression, more complex implementations of gamma curves can be used, for example, a gamma curve that comprises multiple sections with each section conforming to a different mathematical relationship. For example, to avoid having the slope of a gamma curve become infinite at zero, which could be arithmetically inconvenient, a section of the gamma curve near zero can be approximated by a linear relationship, while a section of the gamma curve farther from zero can be approximated by a nonlinear relationship. Such approximations are usually tolerable in that error is typically relatively insignificant and unobjectionable.

In modern digital applications, the gamma function is normally implemented in a look-up table (LUT), which is typically a static random-access memory (RAM) device addressed by the input video signal, with the RAM data output producing the video signal modified according to the gamma curve data stored in the static RAM device. If a video processor is required to incorporate several gamma functions, it either utilizes a limited number of LUTs (e.g., RAMs) between which the video processor can switch in a fast and straightforward manner, or one or more LUTs (e.g., RAMs) that are downloaded with different gamma curve data every time a mode or application changes. In either case, fine-tuning the gamma curve "on the fly" is hardly practical, since it requires both storage of large amounts of data for various pre-set gamma tables in the system memory and/or continuous data downloads of these pre-stored data.

Prior-art adaptive piece-wise gamma approximation methods, such as the one proposed by Lin in U.S. Pat. No. 6,293,165 B1, are complex and require substantial hardware resources. The linear gamma approximation methods are imprecise, and the systems that use digital correction for linear gamma approximation, such as described by Mourik in U.S. Pat. No. 6,137,542, are not intended for producing hundreds of continuously synthesizable gamma curves.

Thus, a technique is needed for efficiently providing gamma curve adjustment over a wide range of variable gamma curves using minimal resources.

BRIEF SUMMARY

A method and apparatus for hardware-efficient continuous gamma curve adjustment is provided. In accordance with at least one embodiment, a first representation of a first gamma curve is stored in a look-up table, a second representation of a second gamma curve is stored in a look-up table, and a video signal is modified in accordance with an interpolation of at least a portion of the first representation of the first gamma curve and at least a portion of the second representation of the second gamma curve. In accordance with at least one embodiment, the at least a portion of the first representation of the first gamma curve is multiplied by a one's complement of a normalized weight factor, the at least a portion of the second representation of the second gamma curve is multiplied by the normalized weight factor, and the results are added together to obtain an output video signal. In accordance with at least one embodiment, at least one of the first representation of the first gamma curve, the second representation of the second gamma curve and the normalized weight factor may be adjusted to compensate for interpolation errors.

BRIEF DESCRIPTION OF THE SEVERAL VIEWS OF THE DRAWINGS

The present invention may be better understood, and its features made apparent to those skilled in the art by referencing the accompanying drawings.

The use of the same reference symbols in different drawings indicates similar or identical items.

DETAILED DESCRIPTION

Figure 1:
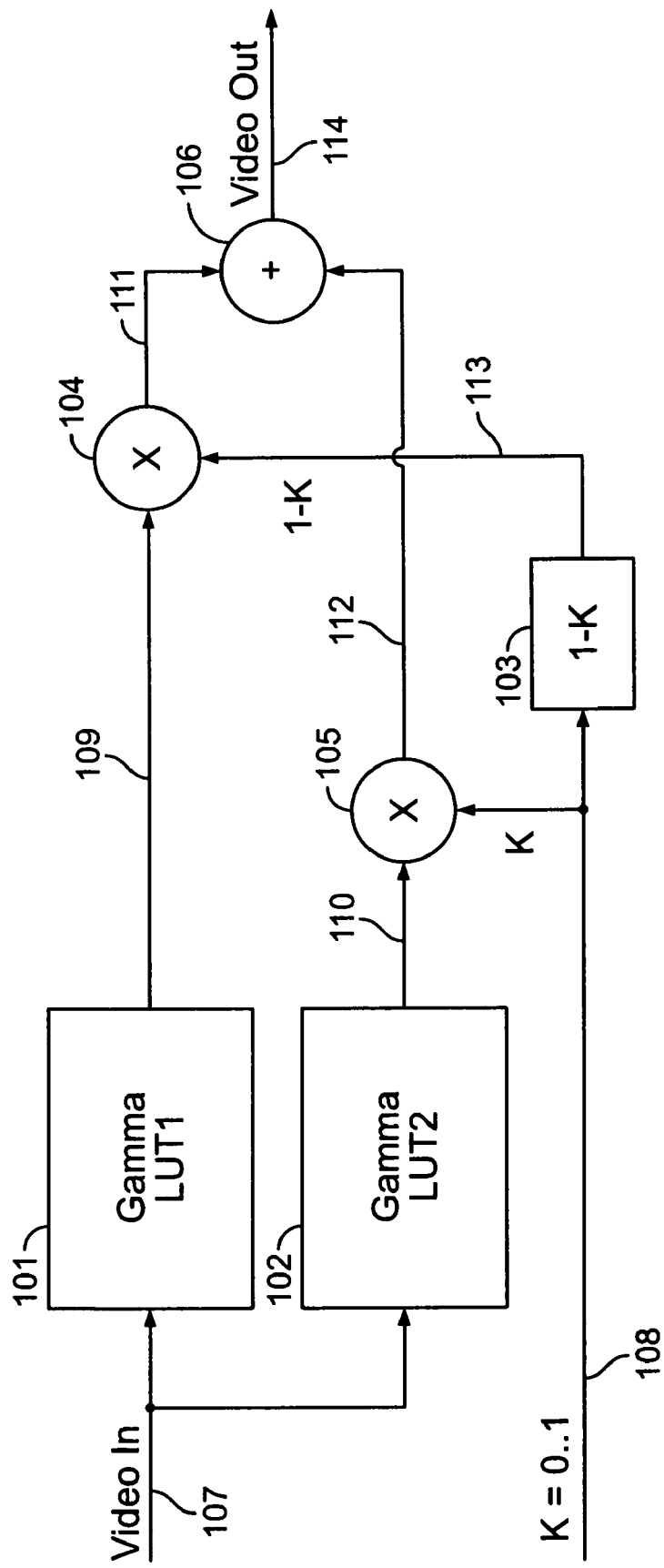
FIG. 1 is a block diagram illustrating apparatus in accordance with at least one embodiment.

A method and apparatus for hardware-efficient continuous gamma curve adjustment is provided. In accordance with at least one embodiment, a first representation of a first gamma curve is stored in a look-up table, a second representation of a second gamma curve is stored in a look-up table, and a video signal is modified in accordance with an interpolation of at least a portion of the first representation of the first gamma curve and at least a portion of the second representation of the second gamma curve. In accordance with at least one embodiment, the video signal is modified by determining a first weighting and a second weighting based on the normalized weight factor, where the sum of the first weighting and the second weighting equals one, by applying a first weighting to the at least a portion of the first representation of the first gamma curve to determine a first addend, and by applying a second weighting to the at least a portion of the second representation of the second gamma curve to determine a second addend. The first addend and the second addend are then added to obtain an output video signal. In accordance with at least one embodiment, the at least a portion of the first representation of the first gamma curve is multiplied by a one's complement of a normalized weight factor, the at least a portion of the second representation of the second gamma curve is multiplied by the normalized weight factor, and the results are added together to obtain an output video signal. In accordance with at least one embodiment, at least one of the first representation of the first gamma curve, the second representation of the second gamma curve and the weight factor are adjusted to distribute interpolation errors. As the video signal can convey a video image representation among and/or within components of a video system applying gamma correction to a video signal can transform an uncorrected video image representation into a corrected video image representation.

A capability of continuous gamma curve adjustment is a useful and desirable feature in many video applications. To name just a few, these applications include precise fine-tuning of a display gamma at a factory, real-time image analysis, satisfying individual or ethnic-group viewer preferences, satisfying multi-standard product requirements, adjusting for human-eye sensitivity to color, auto-adjusting gamma curves (e.g., contrast) in response to sensing ambient light, etc. In modern displays, such as in digital light processing (DLP) displays or displays having a display-specific non-linear gamma, for example, liquid crystal on silicon (LCOS) displays, whose gamma characteristics no longer match the standard transmission gamma, examples of which include 2.2 for NTSC or 2.8 for PAL (which affords better contrast), the video signal generally should be converted to linear gamma.

Accordingly, a practical solution for precise and continuous gamma curve synthesis is provided. Such a solution may be implemented as a hardware implementation responsive to a single control parameter and which can be implemented using a small amount of hardware resources.

FIG. 1 is a block diagram illustrating apparatus in accordance with at least one embodiment. The apparatus comprises first gamma look-up table 101, second gamma look-up table 102, inverter 103, first multiplier 104, second multiplier 105, and adder 106. A video signal input 107 is provided to first and second gamma look-up tables 101 and 102. First and second gamma look-up tables 101 and 102 provide at their respective first and second gamma look-up table outputs 109 and 110 data representative of at least a portion of (e.g., a point along) a first gamma curve, the data for which are stored in first gamma look-up table 101, and of at least a portion of (e.g., a point along) a second gamma curve, the data for which are stored in second gamma look-up table 102. A gamma adjustment value is provided at gamma adjustment value input 108. The gamma adjustment value is applied to an input of inverter 103 and an input of second multiplier 105. Second gamma look-up table output 110 is provided to an input of second multiplier 105. First gamma look-up table output 109 is provided to an input of first multiplier 104. An inverter output 113 of inverter 103 is provided to an input of first multiplier 104. A first multiplier output 111 of first multiplier 104 is provided to an input of adder 106. A second multiplier output 112 of second multiplier 105 is provided to an input of adder 106. A video signal output of adder 106 provides an output video signal.

The apparatus provides an ability to synthesize a family of gamma curves lying between two curves stored in gamma look-up tables 101 and 102, by means of linear interpolation between them. The linear interpolation is hardware-efficient as it can be implemented using two multipliers (e.g., multiplier 104 and 105) and an adder (e.g., adder 106). A normalized weight factor K applied to multiplier 105 is preferably in the range of zero to one, while the weight factor applied to the 104 multiplier is preferably complimentary and is preferably equal to 1−K. The summation of the two multiplier outputs (e.g., output 111 of multiplier 104 and output 112 of multiplier 105) produces video with a gamma gracefully varying with the value of normalized weight factor K.

To further simplify the solution, the (1−K) block (e.g., inverter 103) can be implemented as a simple bus inverter that produces a one's complement of the input digital value (e.g. the gamma adjustment value (e.g., normalized weight factor K) at gamma adjustment value input 108). For example, if normalized weight factor K is implemented as a 10-bit number with a maximum value of "1111111111"b (1023d), which represents a normalized 1, then, for example, a complementary (e.g., inverted) value of "1011110000"b (752d) is "0100001111"b (271d). The sum of two values equals normalized 1 (1023d), which holds true in the above example, since 752d+271d=1023d.

Figure 2:
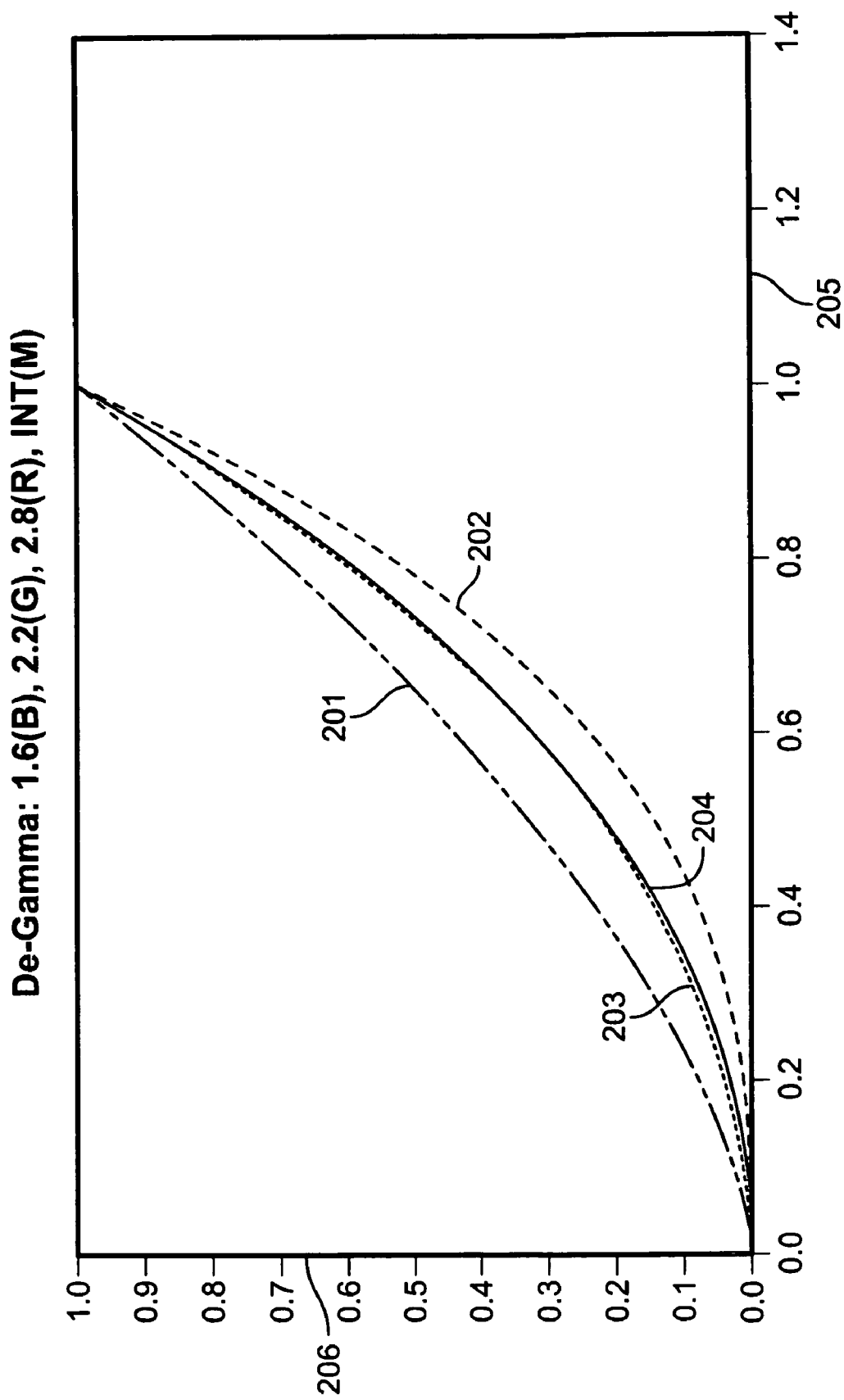
FIG. 2 is a graph illustrating a range of gamma curves which may be implemented in accordance with at least one embodiment.

FIG. 2 is a graph illustrating a range of gamma curves which may be implemented in accordance with at least one embodiment. The graph is plotted against a coordinate system comprising input axis 205 as a horizontal axis and output axis 206 as a vertical axis. The range of gamma curves includes theoretically computed (ideal) gamma curves comprising a first gamma curve 201 for gamma=1.6, a second gamma curve 202 for gamma=2.8, a fourth (ideal) gamma curve 204 for gamma=2.2, and also a third (synthesized) gamma curve 203, based on interpolation between first gamma curve 201 and second gamma curve 202 according to some value of normalized weight factor K, that closely matches the fourth (ideal) gamma curve 204 for gamma=2.2 curve. The numerical discrepancies appearing between the fourth (ideal) gamma curve 204 and the third (synthesized) gamma curve 203 for gamma=2.2 can be used as a distributed error and applied to modify the data in one or more of the first gamma curve 101, the second gamma curve 102 and the weight factor to minimize the extent to which third gamma curve 103 deviates from its respective mathematically ideal curves Loading gamma look-up tables with such error-distributed gamma curve data has no hardware implications, so it does not adversely affect cost, complexity, or performance.

Figure 3:
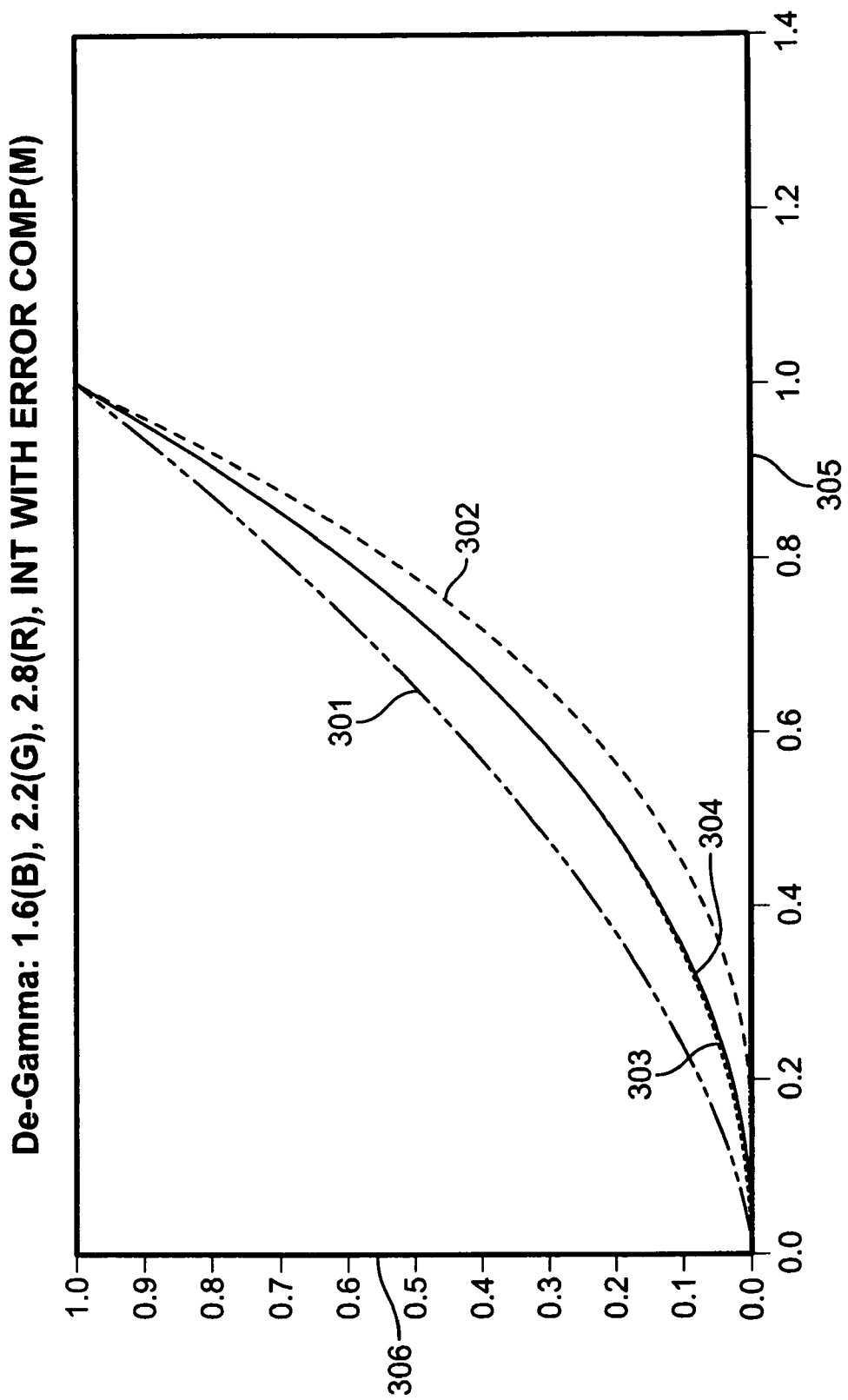
FIG. 3 is a graph illustrating a range of gamma curves where error has been distributed in accordance with at least one embodiment.

FIG. 3 is a graph illustrating a range of gamma curves where error has been distributed in accordance with at least one embodiment. The graph is plotted against a coordinate system comprising input axis 305 as a horizontal axis and output axis 306 as a vertical axis. The graph shows a first gamma curve 301 for gamma=1.6, a second gamma curve 302 for gamma=2.8, a fourth (ideal) gamma curve 304 for gamma=2.2, and also a third (synthesized) gamma curve 303, based on interpolation between first gamma curve 301 and second gamma curve 302 according to some value of normalized weight factor K, that closely matches the fourth (ideal) gamma curve 304 for gamma=2.2 curve. The modification achieved by distributing the error results in a nearly-perfect match between synthesized and computed curves for gamma=2.2. It should be noted that the gamma values above have been chosen for the purpose of explanation and that a wide range of possible gamma curves can be synthesized with high accuracy for a wide range of gamma values.

With K=0 or K=1, the synthesized gamma curves precisely match the computed 1.6 or 2.8 curves. In accordance with an embodiment implemented using a 10-bit normalized weight factor K, a full family of 1023 gracefully varying gamma curves in between the computed 1.6 and 2.8 curves can be produced by simply varying the 10-bit normalized weight factor K. Particular values of the normalized weight factor K that result in curves that closely approximate certain gamma curves can be noted to allow synthesis of those certain gamma curves by application of those particular values. For example, a gamma-curve-value-to-normalized-weight-factor-value look-up table may be added to gamma curve adjustment input 108 to allow conversion of desired gamma curve values into normalized weight factor values that yield gamma curve approximations that are very similar to ideal gamma curves corresponding to those desired gamma curve values.

Figure 4:
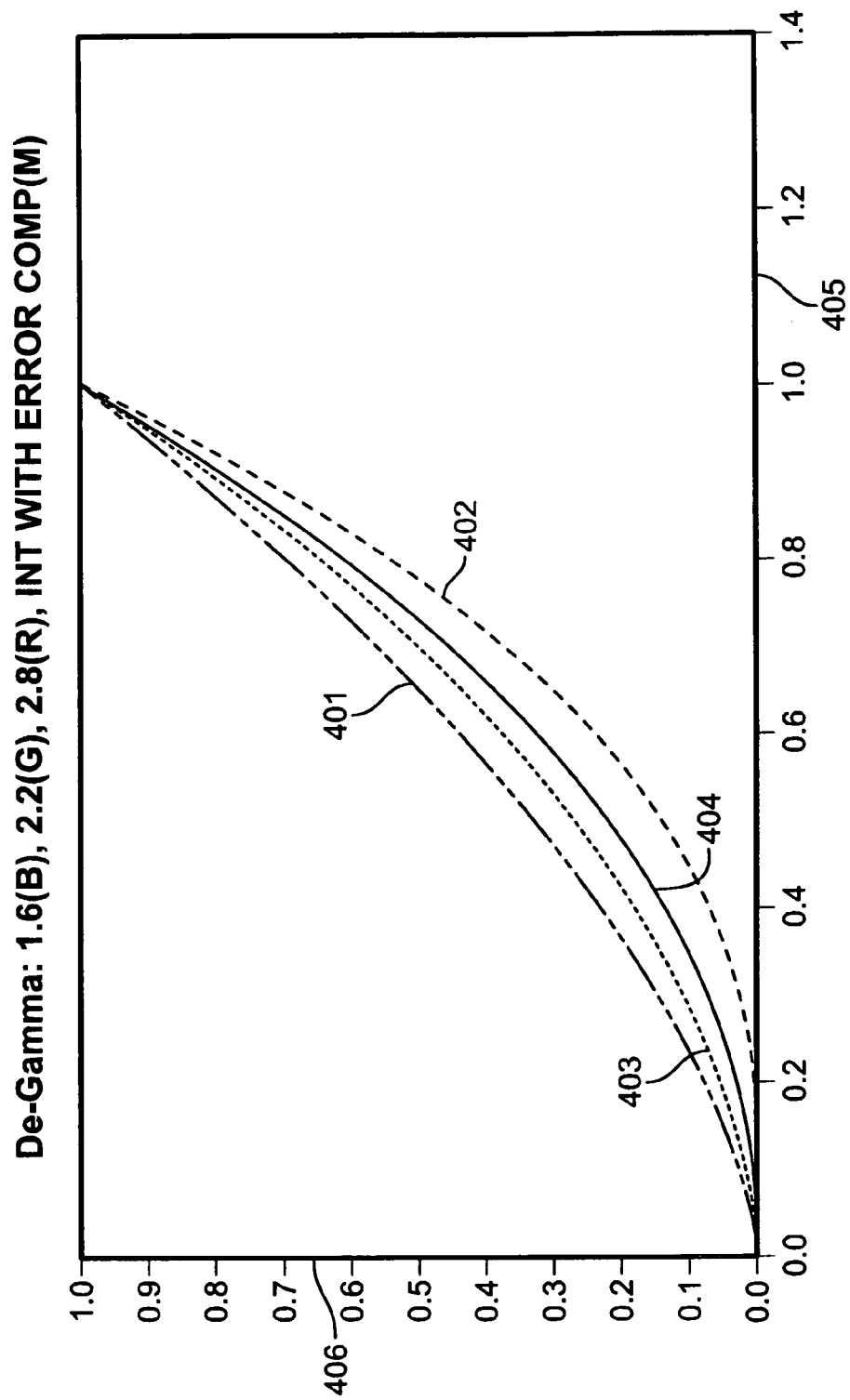
FIG. 4 is a graph illustrating a plurality of gamma curves that can be synthesized in accordance with at least one embodiment.

FIG. 4 is a graph illustrating a plurality of gamma curves that can be synthesized in accordance with at least one embodiment. The graph is plotted against a coordinate system comprising input axis 405 as a horizontal axis and output axis 406 as a vertical axis. The graph shows a first gamma curve 401 for gamma=1.6, a second gamma curve 402 for gamma=2.8, a third (synthesized) gamma curve 403, based on interpolation between first gamma curve 401 and second gamma curve 402 according to some value of normalized weight factor K, and a fourth (synthesized) gamma curve 404, based on interpolation between first gamma curve 401 and second gamma curve 402 according to another value of normalized weight factor K. The third (synthesized) gamma curve 403 and the fourth (synthesized) gamma curve 404 are exemplary and can lie anywhere between first gamma curve 401 and second gamma curve 402, depending on their respective values of normalized weight factor K.

Figure 5:
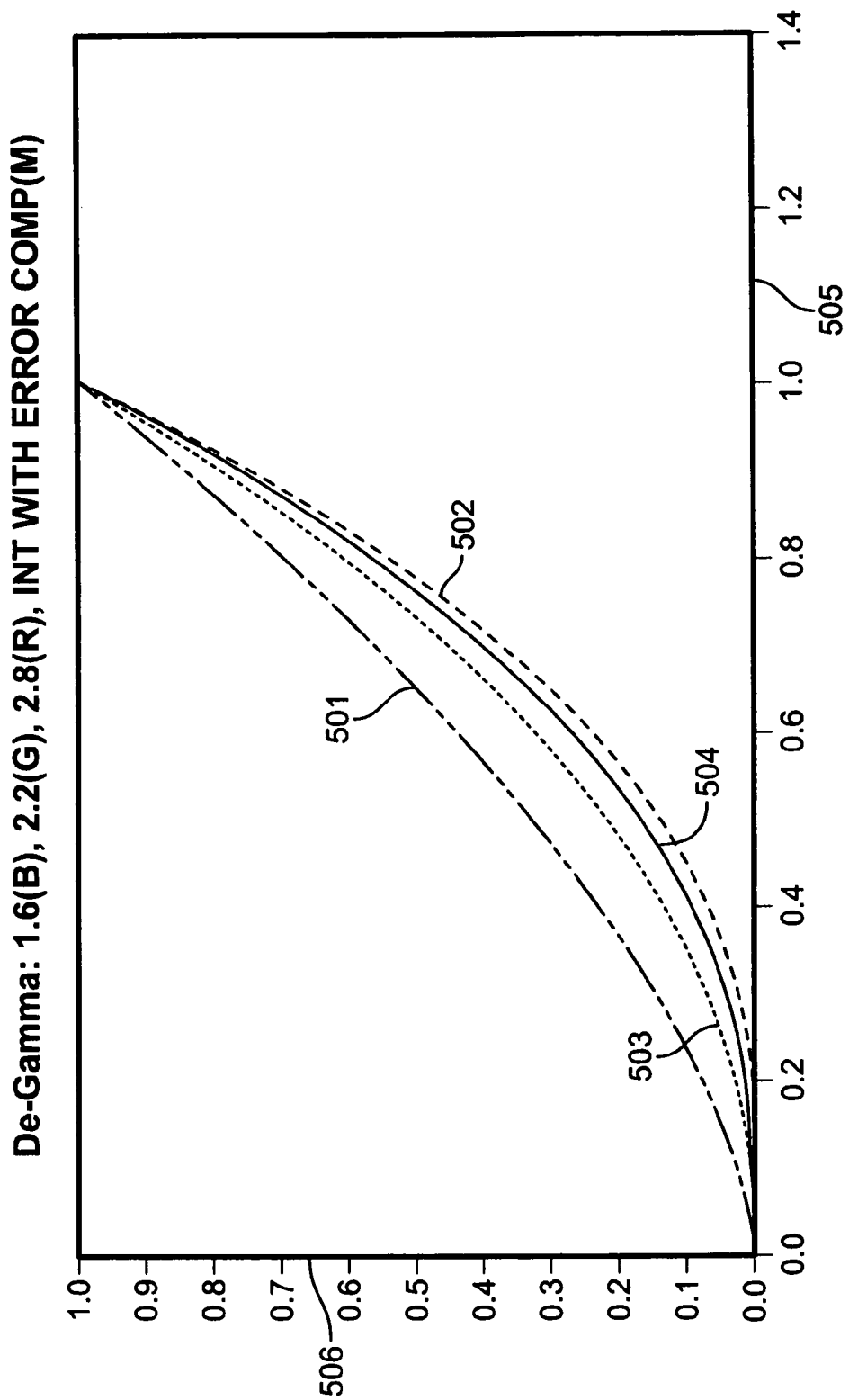
FIG. 5 is a graph illustrating a plurality of gamma curves that can be synthesized in accordance with at least one embodiment.

FIG. 5 is a graph illustrating a plurality of gamma curves that can be synthesized in accordance with at least one embodiment. The graph is plotted against a coordinate system comprising input axis 505 as a horizontal axis and output axis 506 as a vertical axis. The graph shows a first gamma curve 501 for gamma=1.6, a second gamma curve 502 for gamma=2.8, a third (synthesized) gamma curve 503, based on interpolation between first gamma curve 501 and second gamma curve 502 according to some value of normalized weight factor K, and a fourth (synthesized) gamma curve 504, based on interpolation between first gamma curve 501 and second gamma curve 502 according to another value of normalized weight factor K. The third (synthesized) gamma curve 503 and the fourth (synthesized) gamma curve 504 are exemplary and can lie anywhere between first gamma curve 501 and second gamma curve 502, depending on their respective values of normalized weight factor K.

Figure 6:
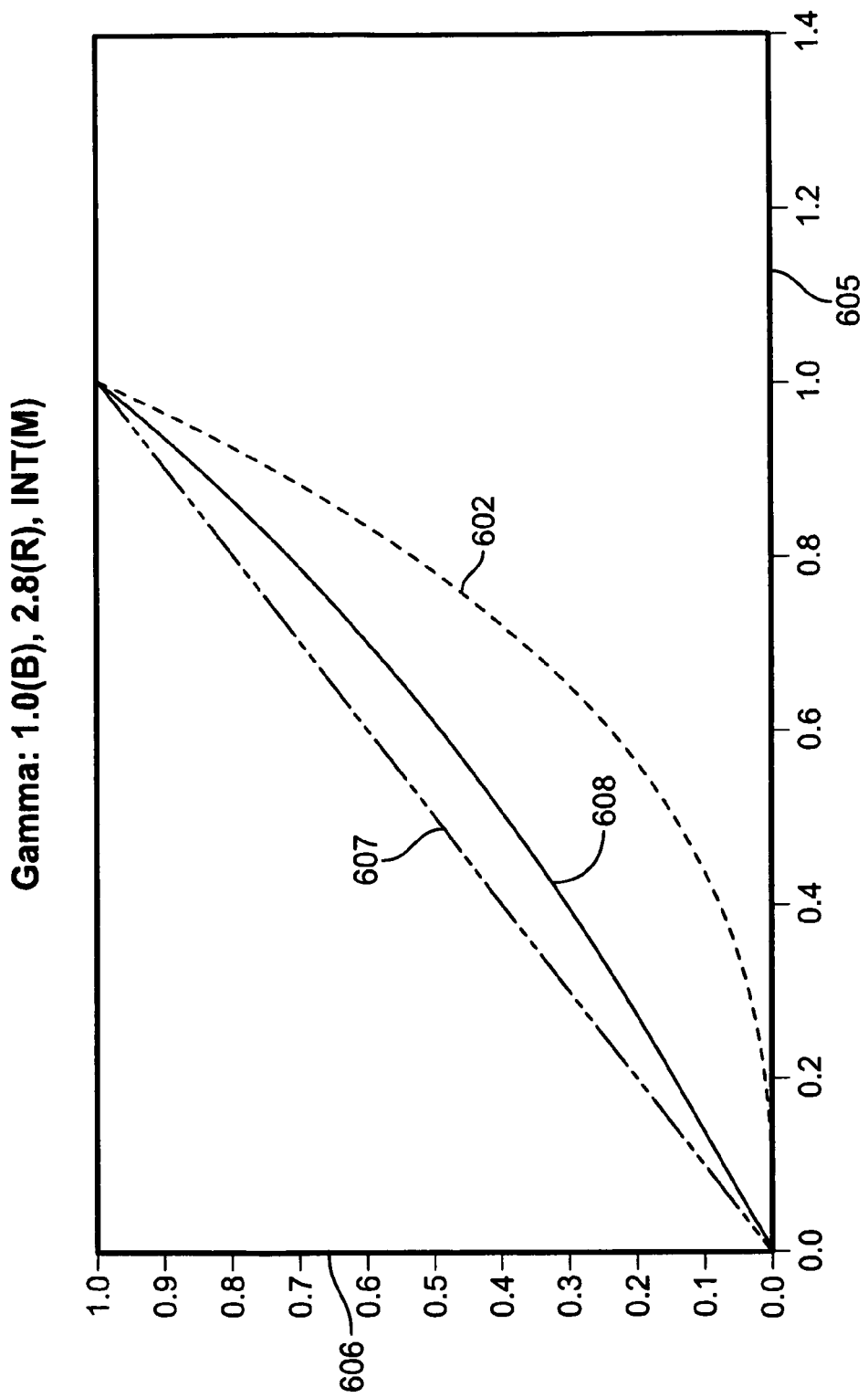
FIG. 6 is a graph illustrating a plurality of gamma curves that can be synthesized in accordance with at least one embodiment.

FIG. 6 is a graph illustrating a plurality of gamma curves that can be synthesized in accordance with at least one embodiment. The graph is plotted against a coordinate system comprising input axis 605 as a horizontal axis and output axis 606 as a vertical axis. The graph shows a first gamma curve 607 for gamma=1.0, a second gamma curve 602 for gamma=2.8, and a third (synthesized) gamma curve 608, based on interpolation between first gamma curve 607 and second gamma curve 602 according to some value of normalized weight factor K. The third (synthesized) gamma curve 608 is exemplary and can lie anywhere between first gamma curve 607 and second gamma curve 602, depending on the value of normalized weight factor K and the value (1−K), as applied to values of the second gamma curve 602 and first gamma curve 607, respectively, to determine the extent to which those values affect values that determine the position of the third (synthesized) gamma curve 608. In accordance with at least one embodiment, one or more of the first gamma curve 607, the second gamma curve 602, and the third (synthesized) gamma curve 608 may be used to decode gamma values that have been encoded according to an inverse gamma curve. The decoding of the gamma values can be used to expand a range of gamma values that have been compressed according to the inverse gamma curve. The decoded gamma values can be used to output a video signal, for example, to an image display device.

Figure 7:
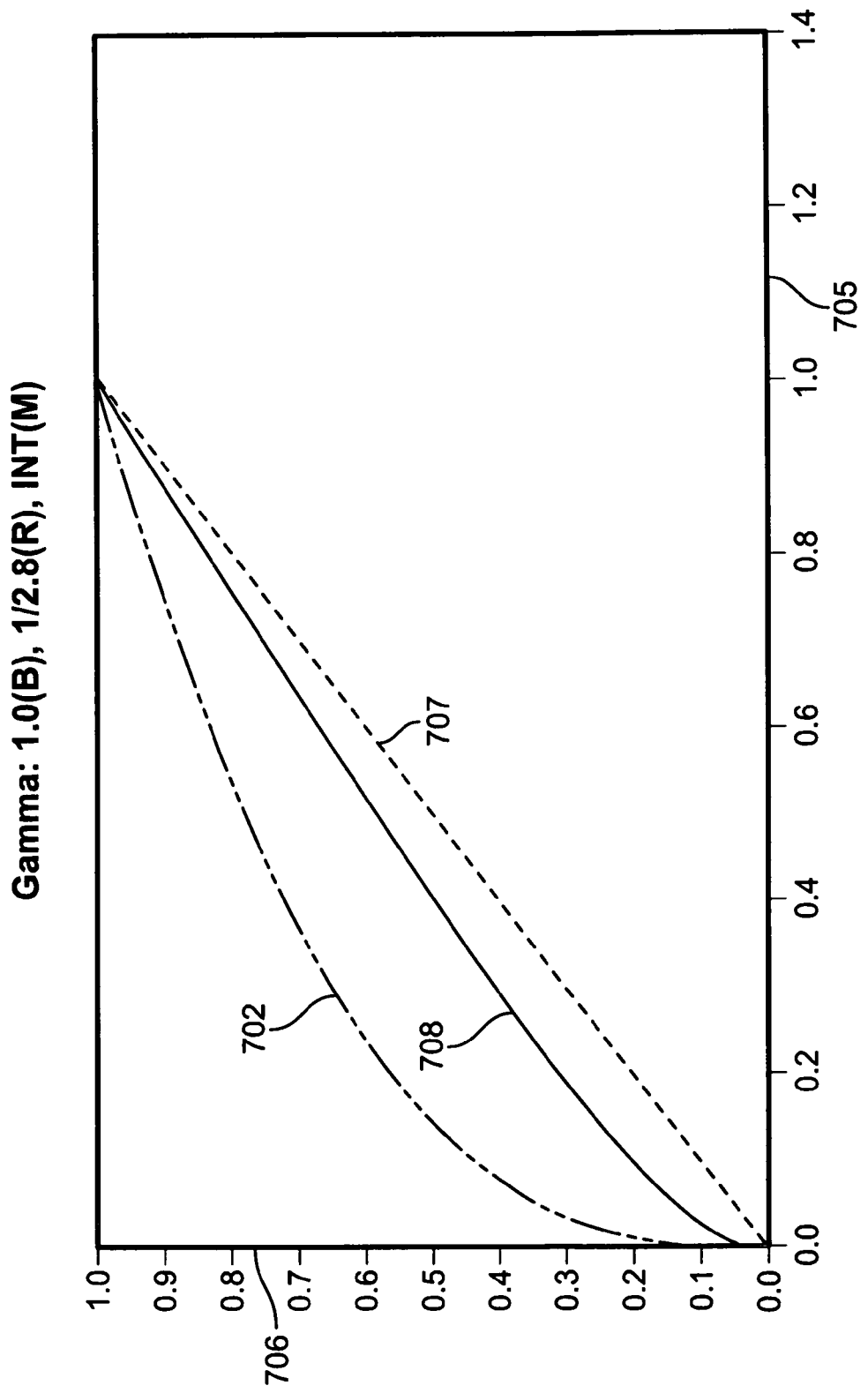
FIG. 7 is a graph illustrating a plurality of inverse gamma curves that can be synthesized in accordance with at least one embodiment.

FIG. 7 is a graph illustrating a plurality of inverse gamma curves that can be synthesized in accordance with at least one embodiment. The graph is plotted against a coordinate system comprising input axis 705 as a horizontal axis and output axis 706 as a vertical axis. The graph shows a first inverse gamma curve 707 for gamma=1.0, a second inverse gamma curve 702 for gamma=1/2.8, and a third (synthesized) inverse gamma curve 708, based on interpolation between first inverse gamma curve 707 and second inverse gamma curve 702 according to some value of normalized weight factor K. The third (synthesized) inverse gamma curve 708 is exemplary and can lie anywhere between first inverse gamma curve 707 and second inverse gamma curve 702, depending on the value of normalized weight factor K and the value (1−K), as applied to values of the second inverse gamma curve 702 and first inverse gamma curve 707, respectively, to determine the extent to which those values affect values that determine the position of the third (synthesized) inverse gamma curve 708. In accordance with at least one embodiment, one or more of the first inverse gamma curve 707, the second inverse gamma curve 702, and the third (synthesized) inverse gamma curve 708 may be used to encode unencoded gamma values, and the encoded gamma values may later be decoded according to a gamma curve. The encoding of the gamma values can be used to compress a range of the unencoded gamma values according to the at least one inverse gamma curve. The encoded gamma values can then be decoded according to at least one gamma curve to yield decoded gamma values. The decoded gamma values can be used to output a video signal, for example, to an image display device.

As another example, an inverse gamma curve, such as one or more of the first inverse gamma curve 707, the second inverse gamma curve 702, and the third (synthesized) inverse gamma curve 708 may represent a nonlinear transfer function of a device, such as a image display device. In such an example, a corresponding (i.e., reciprocal) gamma curve, such as the third (synthesized) gamma curve 608 of FIG. 6 may be used to adjust gamma values so as to compensate for the nonlinearity of the device. Thus, gamma curves, such as those illustrated in FIG. 6, and inverse gamma curves, such as those illustrated in FIG. 7, may describe nonlinearities of system components or may be implemented for a variety of purposes, such as compressing, expanding, or adjusting gamma values, for example, to compensate for other nonlinearities in the system or to nonlinearly encode and decode gamma values, for example, for storage and/or communication. Gamma curves and/or inverse gamma curves may correspond to gamma functions for gammas of less than one or greater than one, as may be appropriate for an implementation.

Figure 8:
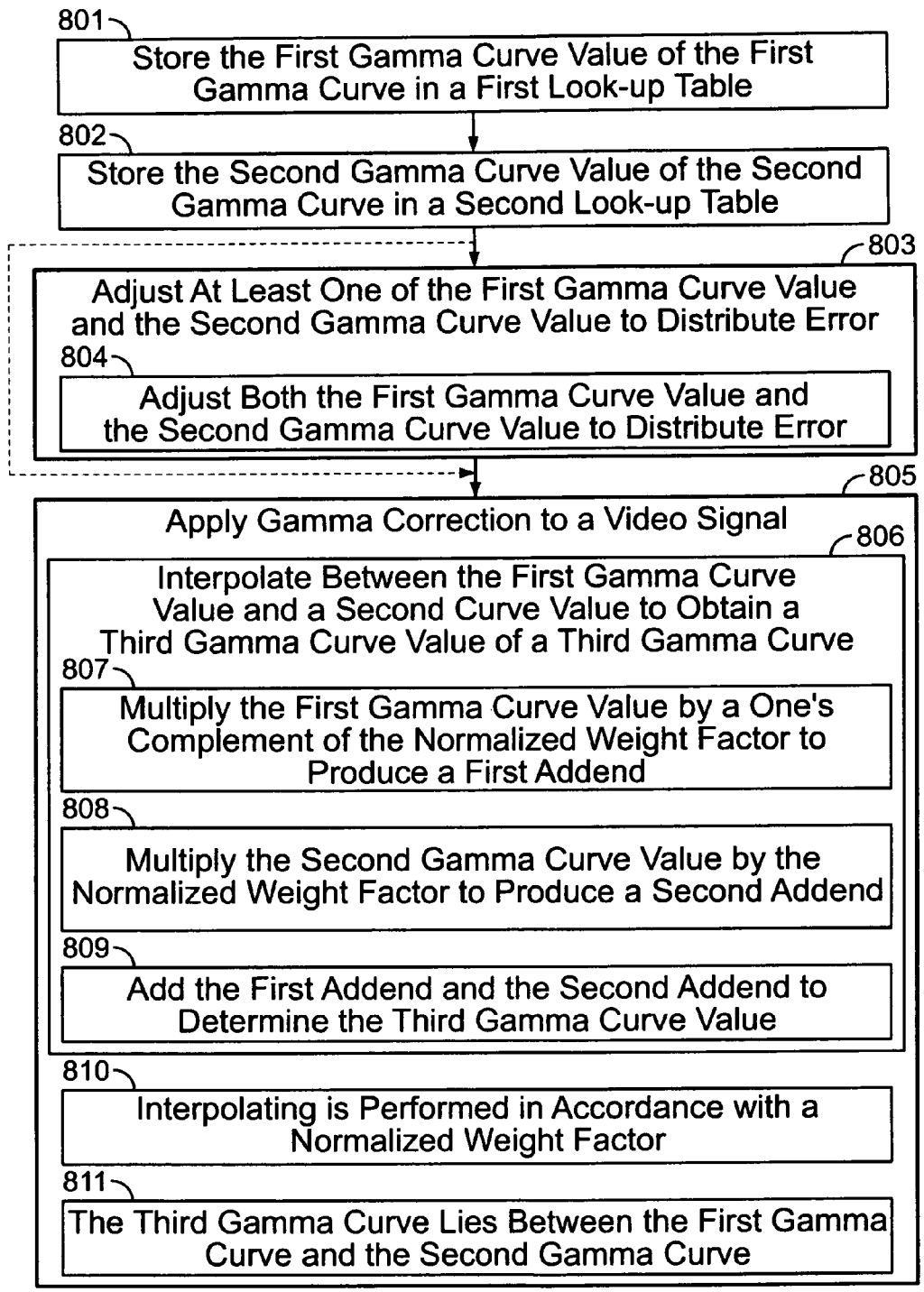
FIG. 8 is a flow diagram illustrating a method in accordance with at least one embodiment.

FIG. 8 is a flow diagram illustrating a method in accordance with at least one embodiment. The method begins in step 801, where a first gamma curve value of a first gamma curve is stored in a first look-up table. The method continues in step 802, where a second gamma curve value of a second gamma curve is stored in a second look-up table. The first gamma curve value, which can be represented by Vout, can be determined, for example by using normalized values of Vin and Vout, by raising the value of Vin to the gamma power, where gamma is the gamma value of the first gamma curve. That first gamma curve value can then be stored in a location in the first look-up table that will be accessed when a input value corresponding to the normalized value of Vin is provided as an input. Similarly, the second gamma curve value can be determined by raising the value Vin to the gamma power, where its gamma is the gamma value of the second gamma curve. A plurality of first gamma curve values and a plurality of second gamma curve values can be determined and stored in the first look-up table and second look-up table, respectively, where each of the plurality of first gamma curve values corresponds to a distinct value of Vin, and where each of the plurality of second gamma curve values corresponds to a distinct value of Vin. Thus, the first look-up table can be populated with a plurality of first gamma curve values that define the first gamma curve, and the second look-up table can be populated with second gamma curve values that define the second gamma curve.

The method optionally either continues to step 803 or continues to step 805. If the method continues to step 803, at least one of the first gamma curve value of the first gamma curve, the second gamma curve value of the second gamma curve, and the weight factor is adjusted to compensate for error in step 803. Step 803 may include step 804. In step 804, both the first gamma curve value of the first gamma curve and the second gamma curve value of the second gamma curve are adjusted to compensate for error.

From step 803 (or optionally from step 802), the method continues to step 805. In step 805, gamma correction is applied to a video signal. Step 805 may include step 806. In step 806, interpolation is performed between a first gamma curve value of a first gamma curve and a second gamma curve value of a second gamma curve to obtain a third gamma curve value of a third gamma curve. Step 806 may include steps 807, 808, and/or 809. In step 807, the first gamma curve value of the first gamma curve is multiplied by a one's complement of a normalized weight factor to produce a first addend. In step 808, the second gamma curve value of the second gamma curve is multiplied by the normalized weight factor to produce a second addend. In step 809, the first addend and the second addend are added to determine the third gamma curve value of the third gamma curve.

Step 805 may include step 810 and/or step 811. In step 810, the interpolating is performed in accordance with a normalized weight factor. In step 811, the third gamma curve lies between the first gamma curve and the second gamma curve.

In accordance with at least one embodiment, a method comprises applying gamma correction to a video signal to transform an uncorrected video image representation into a corrected video image representation. The applying the gamma correction to the video signal comprises interpolating between a first gamma curve value of a first gamma curve and a second gamma curve value of a second gamma curve to obtain a third gamma curve value of a third gamma curve. In accordance with at least one embodiment, the interpolating is performed in accordance with a normalized weight factor. In accordance with at least one embodiment, the interpolating further comprises multiplying the first gamma curve value of the first gamma curve by a one's complement of the normalized weight factor to produce a first addend, multiplying the second gamma curve value of the second gamma curve by the normalized weight factor to produce a second addend, and adding the first addend and the second addend to determine the third gamma curve value of the third gamma curve. In accordance with at least one embodiment, the third gamma curve lies between the first gamma curve and the second gamma curve.

In accordance with at least one embodiment, the method further comprises storing the first gamma curve value of the first gamma curve in a first look-up table and storing the second gamma curve value of the second gamma curve in a second look-up table. In accordance with at least one embodiment, the method further comprises adjusting at least one of the first gamma curve value of the first gamma curve, the second gamma curve value of the second gamma curve, and the weight factor to compensate for error. In accordance with at least one embodiment, adjusting at least one of the first gamma curve value of the first gamma curve and the second gamma curve value of the second gamma curve further comprises adjusting both the first gamma curve value of the first gamma curve and the second gamma curve value of the second gamma curve to compensate for error.

In accordance with at least one embodiment, a method for applying gamma correction to a video signal is tied to a particular machine or apparatus. For example, in accordance with at least one embodiment, the method is tied to a video gamma correction apparatus. As another example, in accordance with at least one embodiment, the method is tied to a television set. As yet another example, in accordance with at least one embodiment, the method is tied to an image projector. As a further example, in accordance with at least one embodiment, the method is tied to an image display. As another example, in accordance with at least one embodiment, the method is tied to a camera. As yet another example, in accordance with at least one embodiment, the method is tied to an image processor. As a further example, in accordance with at least one embodiment, the method is tied to an image storage device.

In accordance with at least one embodiment, the method for applying gamma correction to a video signal transforms a particular article into a different state or thing. As one example, the method transforms an uncorrected image representation, for example an uncorrected video image representation, into a corrected image representation, for example a corrected video image representation. In accordance with at least one embodiment, such transformation may result, for example, in changes of states of semiconductor devices that drive pixel elements of a display device and/or changes of states of memory elements that store an image representation.

In accordance with at least one embodiment, an apparatus comprises an input for receiving an input video signal value corresponding to an input video signal, a first look-up table for obtaining a first gamma curve value of a first gamma curve based on the input video signal value, a second look-up table for obtaining a second gamma curve value of a second gamma curve based on the input video signal value, an inverter for obtaining a one's complement of a normalized weight factor, a first multiplier for multiplying the first gamma curve value of the first gamma curve by the one's complement of the normalized weight factor to produce a first addend, a second multiplier for multiplying the second gamma curve value of the second gamma curve by the normalized weight factor to produce a second addend, and an adder for adding the first addend and the second addend to determine an output video signal value. In accordance with at least one embodiment, the apparatus further comprises an output for outputting the output video signal value, wherein the output video signal value represents a third gamma curve value of a third gamma curve, wherein the third gamma curve lies between the first gamma curve and the second gamma curve.

In accordance with at least one embodiment, at least one of the first gamma curve value of the first gamma curve and the second gamma curve value of the second gamma curve is adjusted to compensate for error. In accordance with at least one embodiment, both the first gamma curve value of the first gamma curve and the second gamma curve value of the second gamma curve are adjusted to compensate for error.

In accordance with at least one embodiment, an apparatus comprises means for storing a first representation of a first gamma curve, means for storing a second representation of a second gamma curve, and means for modifying a video signal to transform an uncorrected video image representation into a corrected video image representation in accordance with an interpolation of at least a portion of the first representation of the first gamma curve and at least a portion of the second representation of the second gamma curve. In accordance with at least one embodiment, the means for modifying the video signal obtains the interpolation based on a normalized weight factor. In accordance with at least one embodiment, the means for modifying the video signal determines a first weighting and a second weighting based on the normalized weight factor and modifies the video signal by applying a first weighting to the at least a portion of the first representation of the first gamma curve and by applying a second weighting to the at least a portion of the second representation of the second gamma curve. In accordance with at least one embodiment, the means for modifying the video signal modifies the video signal by additively combining a first addend determined by applying the first weighting to the at least a portion of the first representation of the first gamma curve and a second addend determined by applying the second weighting to the at least a portion of the second representation of the second gamma curve.

In accordance with at least one embodiment, the means for modifying the video signal retrieves the at least a portion of the first representation of the first gamma curve from the means for storing the first representation of the first gamma curve and the at least a portion of the second representation of the second gamma curve from the means for storing the second representation of the second gamma curve based on an input video signal. In accordance with at least one embodiment, the first representation of the first gamma curve is adjusted to compensate for error. In accordance with at least one embodiment, the second representation of the second gamma curve is adjusted to compensate for error.

In accordance with at least one embodiment, the means for storing the first representation of the first gamma curve, the means for storing the second representation of the second gamma curve, and the means for modifying the video signal can be implemented in any of a variety of ways. For example, one or more of such means can be implemented in hardware, for example, using one or more memory devices and/or locations and one or more logic devices and/or processors. As another example, one or more of such means can be implemented in one or more programmable hardware devices, such as programmable logic devices. As another example, one or more of such means can be implemented in firmware, such as non-volatile memory storing instructions to cause a processor to perform the functions provided by the one or more such means. As another example, one or more such means can be implemented in software, such as volatile memory storing instructions to cause a processor to perform the functions provided by the one or more such means. As another example, at least one such means can be implemented in one of the foregoing manners while at least one other such means can be implemented in a different one of the foregoing manners.

In accordance with at least one embodiment, a means for modifying the video signal is tied to a particular machine or apparatus. For example, in accordance with at least one embodiment, the means is tied to a video gamma correction apparatus. As another example, in accordance with at least one embodiment, the means is tied to a television set. As yet another example, in accordance with at least one embodiment, the means is tied to an image projector. As a further example, in accordance with at least one embodiment, the means is tied to an image display. As another example, in accordance with at least one embodiment, the means is tied to a camera. As yet another example, in accordance with at least one embodiment, the means is tied to an image processor. As a further example, in accordance with at least one embodiment, the means is tied to an image storage device.

In accordance with at least one embodiment, the means for modifying the video signal transforms a particular article into a different state or thing. As one example, the means transforms an uncorrected image representation, for example an uncorrected video image representation, into a corrected image representation, for example a corrected video image representation. In accordance with at least one embodiment, such transformation may result, for example, in changes of states of semiconductor devices that drive pixel elements of a display device and/or changes of states of memory elements that store an image representation.

Although the present invention has been described in considerable detail with regard to the preferred versions thereof, other versions are possible. Therefore, the appended claims should not be limited to the descriptions of the preferred versions contained herein.

What is claimed is:

1. Apparatus comprising:
a first memory location for storing a first representation of a first gamma curve;
a second memory location for storing a second representation of a second gamma curve;
a processor;
non-volatile memory comprising instructions to cause the processor to perform the function of modifying a video signal to transform an uncorrected video image representation into a corrected video image representation in accordance with an interpolation of at least a portion of the first representation of the first gamma curve and at least a portion of the second representation of the second gamma curve, the interpolation being obtained by the processor based on a normalized weight factor, the modifying of the video signal comprising the processor determining a first weighting and a second weighting based on the normalized weight factor and modifying the video signal by applying the first weighting to the at least a portion of the first representation of the first gamma curve and by applying the second weighting to the at least a portion of the second representation of the second gamma curve.

2. The apparatus of claim 1 wherein the non-volatile memory further comprises instructions to cause the processor to modify the video signal by additively combining a first addend determined by applying the first weighting to the at least a the portion of the first representation of the first gamma curve and a second addend determined by applying the second weighting to the at least a portion of the second representation of the second gamma curve.

3. The apparatus of claim 2 wherein the non-volatile memory further comprises instructions to cause the processor to retrieve the at least a portion of the first representation of the first gamma curve from the first memory location and the at least a portion of the second representation of the second gamma curve from the second memory location based on an input video signal.

4. The apparatus of claim 3 wherein the first representation of the first gamma curve is adjusted to compensate for error.

5. The apparatus of claim 4 wherein the second representation of the second gamma curve is adjusted to compensate for error.

* * * * *